(12) United States Patent
Chang et al.

(10) Patent No.: US 9,389,657 B2
(45) Date of Patent: Jul. 12, 2016

(54) RESET OF MULTI-CORE PROCESSING SYSTEM

(75) Inventors: Steven S. Chang, San Jose, CA (US); Anshuman Thakur, Beaverton, OR (US); Ramacharan Sundararaman, Hillsboro, OR (US); Ramon Matas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 13/993,614

(22) PCT Filed: Dec. 29, 2011

(86) PCT No.: PCT/US2011/067864
§ 371 (c)(1),
(2), (4) Date: Jun. 12, 2013

(87) PCT Pub. No.: WO2013/101077
PCT Pub. Date: Jul. 4, 2013

(65) Prior Publication Data
US 2013/0268747 A1     Oct. 10, 2013

(51) Int. Cl.
*G06F 11/00* (2006.01)
*G06F 1/24* (2006.01)
(Continued)

(52) U.S. Cl.
CPC ............. *G06F 1/24* (2013.01); *G06F 1/3228* (2013.01); *G06F 9/4405* (2013.01); *G06F 13/14* (2013.01)

(58) Field of Classification Search
CPC . G06F 15/80; G06F 11/0757; G06F 11/0793; G06F 1/24; G06F 11/1415; G06F 1/3228; G06F 9/4405; G06F 13/14

USPC .......................................... 714/23, 29; 713/2
See application file for complete search history.

(56) References Cited

U.S. PATENT DOCUMENTS

| | | | | |
|---|---|---|---|---|
| 7,191,271 B2* | 3/2007 | Andre | ............... | G06F 13/364 710/119 |
| 2003/0206564 A1* | 11/2003 | Mills | ............... | H04L 12/12 370/528 |

(Continued)

FOREIGN PATENT DOCUMENTS

| | | |
|---|---|---|
| KR | 10-1999-0033159 | 5/1999 |
| KR | 10-2007-0082229 | 8/2007 |
| KR | 10-2008-0016226 | 2/2008 |
| TW | 201333672 A1 | 8/2013 |

OTHER PUBLICATIONS

Dictionary definition of hardware reset, retrieved from https://en.wikipedia.org/wiki/Hardware_reset on Sep. 9, 2015.*

(Continued)

*Primary Examiner* — Yair Leibovich
(74) *Attorney, Agent, or Firm* — Nicholson De Vos Webster & Elliott, LLP (57) ABSTRACT

An initialization core may include reset logic that may detect a global reset signal (GRS). The initialization core may generate one or more packets that enable communication with the cores. The initialization core may send reset packets to each of the cores that instruct the cores to perform a reset. In some embodiments, the reset command may power-off the cores. The initialization core may then transmit unreset packets to each of the cores that instruct the cores to perform an unreset and power-on the cores. In some embodiments, the cores may resume operation automatically without receipt of the unreset packet. The transmission of the packets may be staggered (staged) to control the power-on of the processor and enable the processor unit to more slowly increase its power state.

19 Claims, 10 Drawing Sheets

(51) Int. Cl.
*G06F 13/14* (2006.01)
*G06F 9/44* (2006.01)
*G06F 1/32* (2006.01)

(56) References Cited

U.S. PATENT DOCUMENTS

| | | | |
|---|---|---|---|
| 2004/0003304 A1* | 1/2004 | Kobayashi | G06F 1/266 713/300 |
| 2004/0141461 A1* | 7/2004 | Zimmer et al. | 370/216 |
| 2005/0138249 A1 | 6/2005 | Galbraith et al. | |
| 2008/0189573 A1* | 8/2008 | Darrington et al. | 714/11 |
| 2013/0339663 A1* | 12/2013 | Chang et al. | 712/29 |

OTHER PUBLICATIONS

PCT International Search Report for PCT Counterpart Application No. PCT/US2011/067864, 3 pgs., (Sep. 3, 2012).

PCT Written Opinion of the International Searching Authority for PCT Counterpart Application No. PCT/US2011/067864, 5 pgs., (Sep. 3, 2012).

PCT Notification concerning Transmittal of International Preliminary Report on Patentability (Chapter I of the Patent Cooperation Treaty) for PCT Counterpart Application No. PCT/US2011/067864, 7 pgs., (Jul. 10, 2014).

* cited by examiner

RESET OF MULTI-CORE PROCESSING SYSTEM

CROSS-REFERENCE TO RELATED APPLICATION

This patent application is a U.S. National Phase Application under 35 U.S.C. §371 of International Application No. PCT/US2011/067864, filed Dec. 29, 2011, entitled RESET OF MULTI-CORE PROCESSING SYSTEM.

TECHNICAL FIELD

This disclosure relates generally to the field of microprocessors. In particular, this disclosure relates to a global reset mechanism for processing cores of a multi-core processing unit.

BACKGROUND ART

Until recently, computing devices typically included a single processing unit for each socket available on the computing device's main circuit board. More recently, the single processing unit has been improved to include multiple cores, which enable the processor to execute instructions in parallel using the various cores. An ability to include additional processors or cores on a chip becomes more readily available as the footprint of the cores continues to decrease through advancements in manufacturing.

The inclusion of many cores on a chip, termed "system on a chip" or "SOC", where the SOC is accessible to the computing device through a socket, may present some new challenges to both hardware and software architects. One challenge is that the additional cores should be accessible by the socket with minimized communication paths that link the cores, thereby saving valuable space on the chip for additional cores or other necessary components. These challenges are further complicated when the availability of the cores may change during an operational life of the SOC.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to performing a controlled and configurable global reset of cores in a multi-core processor. The multi-core processor may include many cores, which may be central processing units (CPUs), graphical processing units (GPUs), general processing graphical processing units (GPGPUs), other processing logic, or a combination thereof. The various cores may be in communication with each other and/or an initialization core via an interconnect. The interconnect may be arranged as a mesh interconnect, a shared interconnect, a peer-to-peer (P2P) interconnect, or a ring interconnect.

In accordance with at least some embodiments, an initialization core may include reset logic that may detect a global reset signal (GRS). The GRS may indicate that the initialization core is to perform a global reset of the cores. For example, during a first run of a machine, all the cores may be reset. The cores may also be reset following a rebooting operation or during other computing events. To perform the reset (and subsequent unreset), the initialization core may generate one or more packets that enable communication with the cores. The initialization core may send reset packets to each of the cores that instruct the cores to perform a reset. In some embodiments, the reset command may power-off, turn off, or otherwise terminate operation in the cores. The initialization core may then transmit unreset packets to each of the cores that instruct the cores to perform an unreset and power-on the cores. In some embodiments, the cores may resume operation automatically without receipt of the unreset packet. The transmission of the packets may be staggered, as discussed below, to control the power-on of the processor.

When the cores return to operation, the processor core may experience a rapid change in power (watts) between a first time just prior to powering-on the cores and a second time when all of the cores are powered-on and operational. Thus, reset may cause a large drain (di/dt, excessive current draw or voltage drop from current surges) on a processor to get all the cores in a powered-on state (i.e., running). To reduce a potential of harmful effects caused by this rapid change in power, the cores may be returned to operation in a staged, staggered, or delayed process that spreads the power-up process over time. For example, the initialization core may purposely withhold some packets that unreset some cores and thus intentionally delay the powering-on of those respective cores, and thereby, enable the processor unit to more slowly increase its power state.

The techniques, apparatuses, and systems described herein may be implemented in a number of ways. Example implementations are provided below with reference to the following figures.

Illustrative Environment

Figure 1:
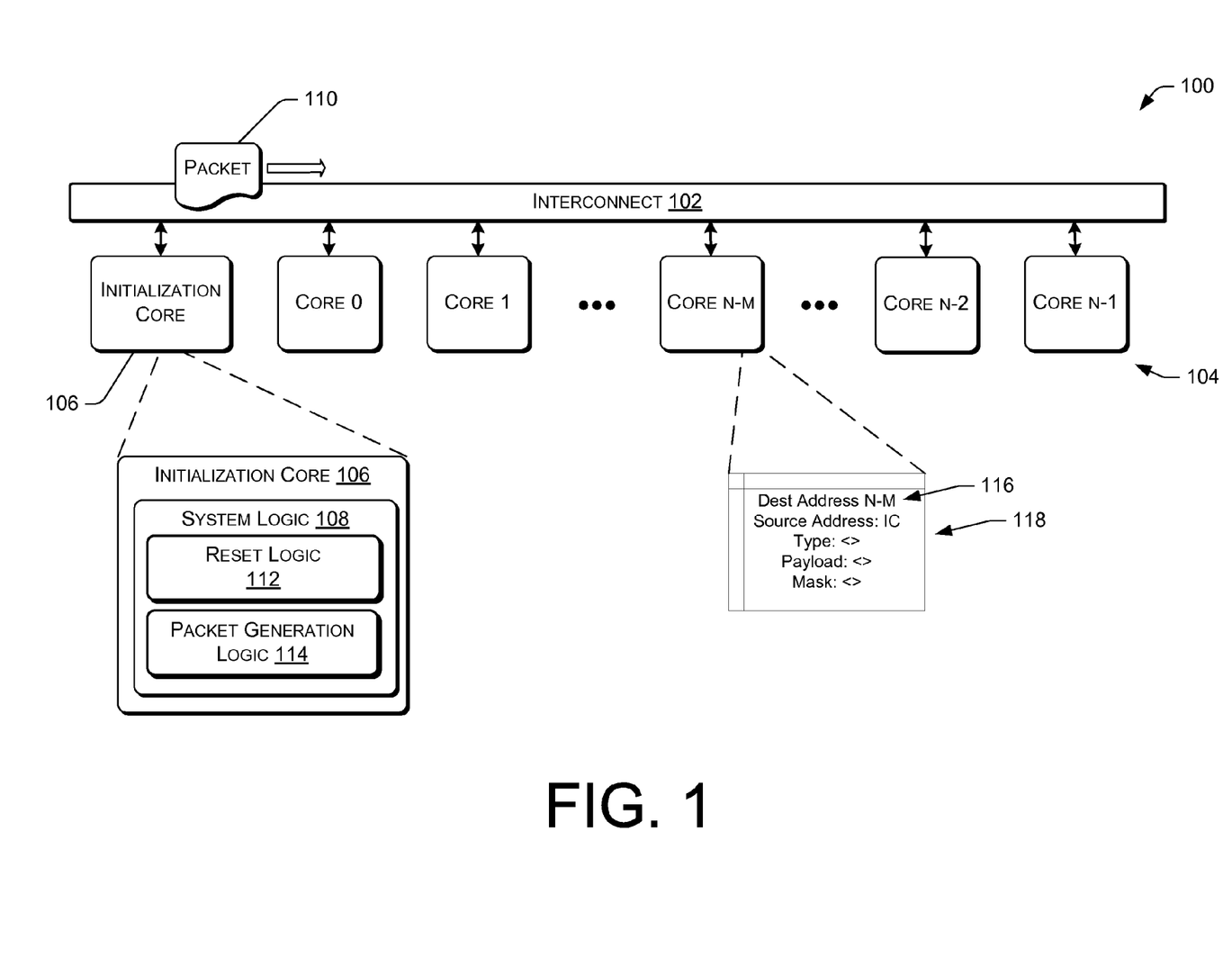
FIG. 1 is a schematic diagram of an illustrative multi-core processing unit that uses an interconnect to facilitate communication between the cores.

FIG. 1 is a schematic diagram of an illustrative multi-core processing unit 100 that uses an interconnect 102 to facilitate communication between the cores. In various embodiments, the multi-core processing unit 100 (or processor) may include a plurality of cores 104, which may be central processing units (CPUs), graphical processing units (GPUs), general processing graphical processing units (GPGPUs), other processing logic, or a combination thereof.

Figure 2:
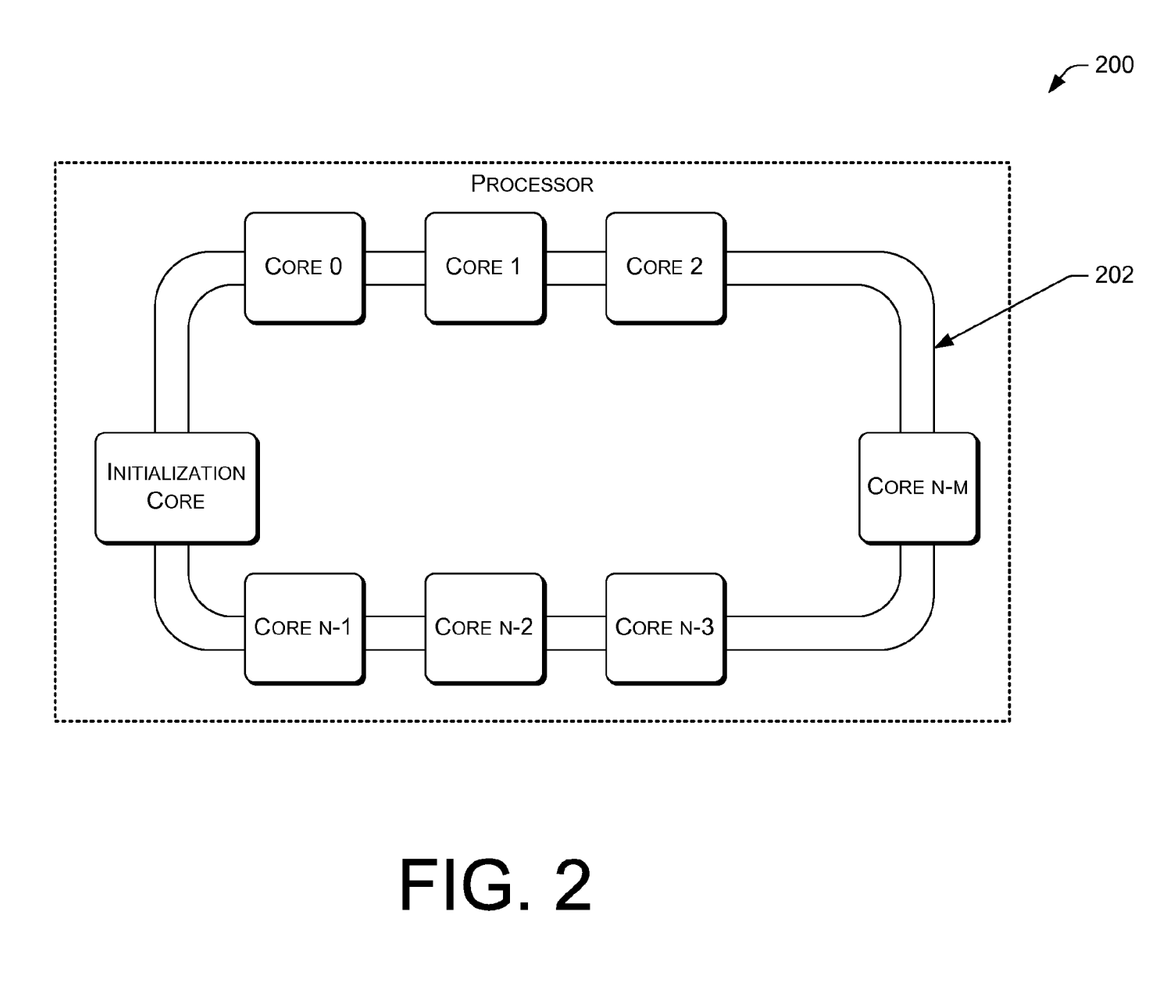
FIG. 2 is a schematic diagram of an illustrative multi-core processing unit that uses an interconnect arranged as a ring structure.
Figure 3:
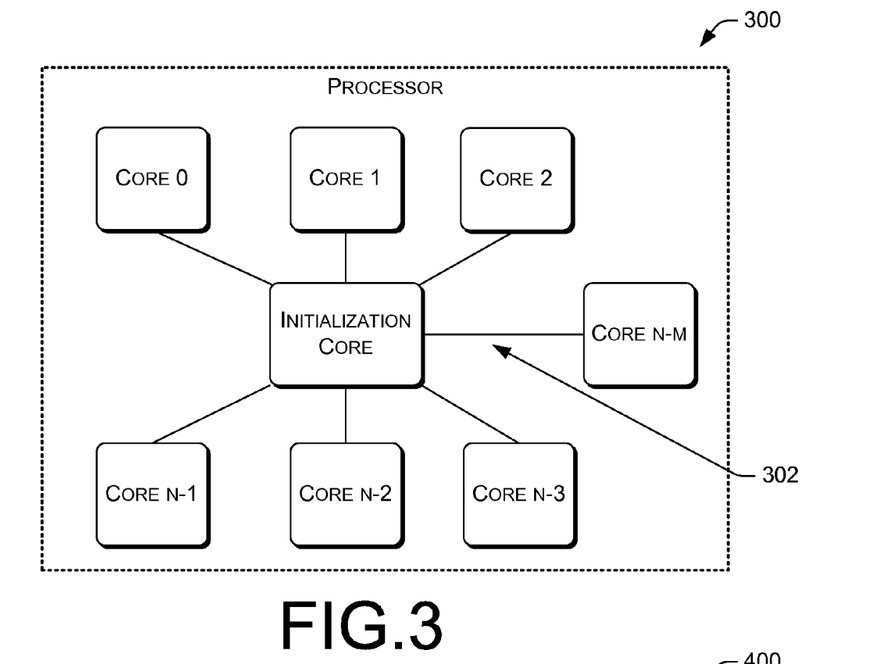
FIG. 3 is a schematic diagram of an illustrative multi-core processing unit that uses an interconnect arranged as a mesh.
Figure 4:
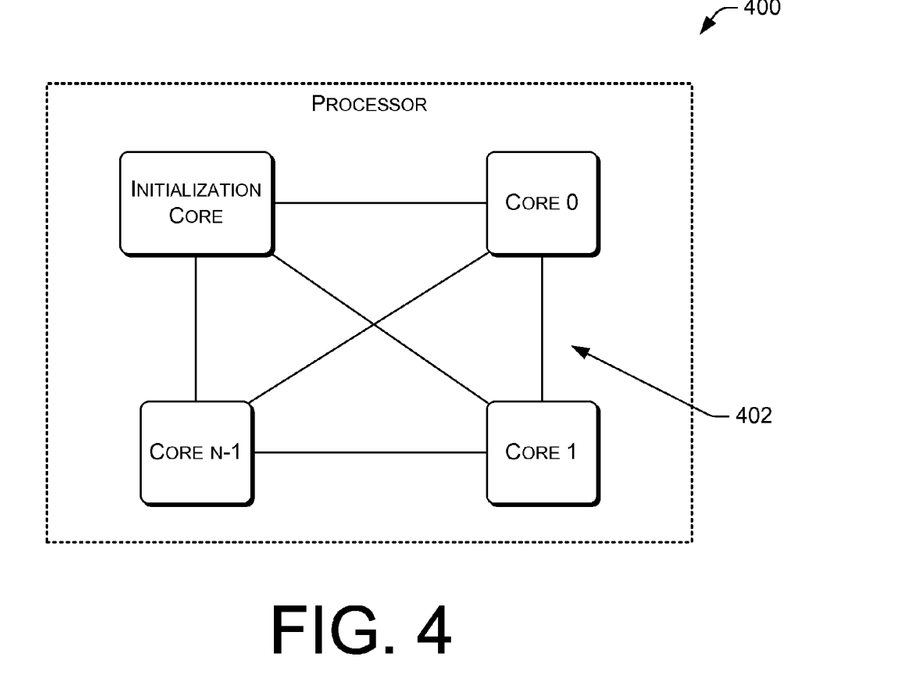
FIG. 4 is a schematic diagram of an illustrative multi-core processing unit that uses an interconnect arranged in a peer-to-peer configuration.

In accordance with the some embodiments, the various cores may be in communication with each other and/or an initialization core 106 via the interconnect 102. In accordance with various embodiments, the interconnect 102 may be arranged as a shared interconnect as shown in FIG. 1, as a ring interconnect as shown in FIG. 2, as a mesh interconnect as shown in FIG. 3, or as a peer-to-peer (P2P) interconnect as shown in FIG. 4.

The initialization core 106 may be a processor core that includes system logic 108. The system logic 108 may be used to transmit reset information (and possibly unreset information) to one or more of the plurality of cores through use of a packet 110. The system logic 108 may include reset logic 112 and packet generation logic. 114. The reset logic may determine how to execute the reset and unreset of the cores. For example, the reset logic 112 may reset all of the cores in a short amount of time or stagger the reset of the cores to power-off the cores over a longer amount of time. The reset logic 112 may then unreset (or power-on) the cores (which are in a standby state and powered-off) using a staggered (or staged) approach that spreads out the power-on process of the cores over time to reduce a power ramp up of the processing core, and thereby reduces potential harm to the processing unit due to a rapid change in power over a relatively short period of time. In some embodiments, the reset logic 112 may be tuned or configured to delay the reset and/or unreset of each of the cores. The reset logic 112 may also include a feedback loop that monitors a time from reset to unreset of the cores and a change in power, and use this information to adjust the delay of the reset and/or unreset of each of the cores.

In accordance with various embodiments, the packet generation logic 114 may create packets that may include reset packets and unreset packets. The packets may communicate instructions, commands, and/or information to the various cores of the multi-core processing unit. For example, the packet generation logic 114 may create a packet for each of the cores to communicate to the cores to perform a reset and power-off the cores. The packet generation logic 114 may then create a second set of packets (one for each core, one for multiple cores, etc.), that communicates to the respective cores to perform an unreset and power-on. The packet generation logic 114 may transmit the second set of packets in a staggered (staged, delayed, spread out) manner such that the cores do not all power-on at a same time.

The packet 110 may include an address of a recipient core, such as the core N-M or another core. In some embodiments, the packet may include multiple addresses of different cores, where the cores may have different information to be transmitted to the respective cores or the cores may have the same information to be transmitted to the respective cores. When the packet 110 is received by a core having a destination address 116 specified by the packet, the core may read at least a portion of the contents 118 of the packet that applies to the core. In some embodiments, a core may read a command (e.g., from a "type", "payload" or other part of the packet) from the packet. The core may then implement the command, such as by resetting (powering-off), unresetting (powering-on), or performing other tasks or functionality as described herein.

In accordance with some embodiments, the initialization core 106 may combine both a reset command and an unreset command into a single packet for a core. In these embodiments, the unreset command may be delayed a predetermined amount of time, thus causing the core to remain in a reset (powered off) state for the predetermined amount of time. Some of the cores may have different delay times, which may cause the power-on of the cores to be staggered and thus not occur at a same time.

In various embodiments, the initialization core 106 may stagger the reset commands to reset the cores at different times. In these instances, the cores may automatically power-on after the reset operation is complete. Thus, no unreset command may be used to power on the cores in some embodiments.

FIG. 2 is a schematic diagram of an illustrative multi-core processing unit 200 that uses an interconnect arranged as a ring structure 202. The ring structure 202 may accommodate an exchange of the packet 110 between the initialization core and the other cores or between any combinations of the cores.

FIG. 3 is a schematic diagram of an illustrative multi-core processing unit 300 that uses an interconnect arranged as a mesh 302. The mesh 302 may accommodate an exchange of the packet 110 between the initialization core and the other cores or between any combinations of the cores.

FIG. 4 is a schematic diagram of an illustrative multi-core processing unit 400 that uses an interconnect arranged in a peer-to-peer configuration 402. The peer-to-peer configuration 402 may accommodate an exchange of the packet 110 between the initialization core and the other cores or between any combinations of the cores.

Illustrative Global Reset

Figure 5:
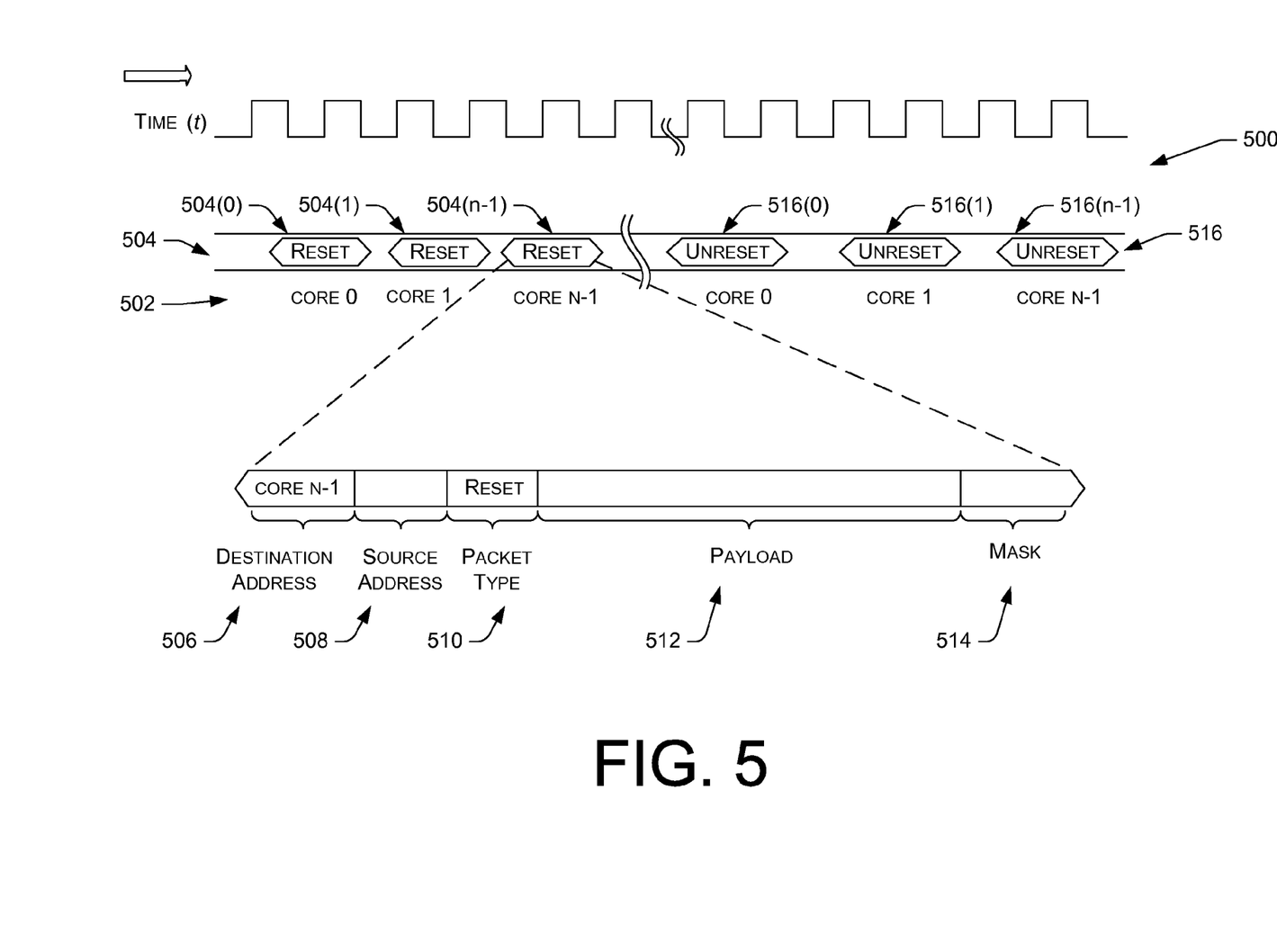
FIG. 5 is a schematic diagram showing illustrative packets that are transmitted to various cores to perform a global reset.

FIG. 5 is a schematic diagram showing packets 500 that are transmitted over time (t) to various cores to perform a controlled and configurable global reset. The packets 500 may be generated by the packet generation logic 114 and transmitted to the various cores 502 in response to instructions from the reset logic 112. For example, the system logic 108 may receive a global reset signal that indicates that the cores 502 are to be reset. The reset logic 112 may then issue a request to the packet generation logic 114 to transmit reset packets 504, such as reset packets 504(0), 504(1), . . . , 504(n−1) to each of the cores 502 at a particular time t.

An illustrative reset packet 504(n−1) shows example information that may be included in the packet. The packet may include a destination address 506 that indicates a core that the packet is to be delivered to, such as core n−1, etc. A source address 508 may indicate an address of a sender of the packet. A packet type 510 may indicate an operation for the core or provide general information to the core. For example, the packet type 510 may be "reset," "unreset," or another packet type. When the packet type 510 is reset, the core having the destination address may perform the reset. The packet may also include a payload 512 and mask 514. The payload 512 may include additional information or instructions for the core having the destination address. For example, the payload may instruct the core to delay a reset or an unreset operation for a predetermined amount of time (e.g., delay×milliseconds) or to perform the reset or the unreset operation at a designated time (e.g., perform at xx:xx:xx.yyy (where xx:xx is a time in the future).

After at least a portion of the reset messages have been transmitted by the packet generation logic 114 and the respective cores have been reset (powered-off), then the reset logic 112 may instruct the packet generation logic 114 to transmit unreset messages to at least some of the cores that are reset, thereby causing the cores to power-on. In some embodiments, the reset logic 112 may reset all the cores at substantially a same time. The reset logic 112 may then stagger the unreset of the cores to gradually power-on the cores. For example, all of the cores may be powered off within a time period. However, the powering-on may be staggered such that the powering on is performed to extend longer than the time period. Thus, the time between transmission of the reset packets ($t_r$) may be less than the time between transmission of the unreset packets ($t_u$).

In various embodiments the cores may all be reset prior to unresetting any cores. However, in some embodiments, some cores may be reset and then unreset before other cores are reset. In some instances, the packet 500 may include a predetermined delay to delay a reset and/or an unreset of the core having the destination address. In such instances, the packets may be transmitted at a same or substantially same time and still have the cores reset or unreset at different times. Further, due to a core's location with respect to a location of the initialization core 106, the time for delivery of the packet may also be a factor in the timing of the reset or unreset operation of a respective core. Thus, the reset logic 112 may be tuned to use the aforementioned factors to stagger the reset and/or the unreset of the cores.

In accordance with some embodiments, the unreset operation may be performed in such a manner that the power increase of the processor follows a substantially linear pattern over time, and thus gradually powers-on. To create a linear pattern of power over time, the cores may be grouped in such a way that low power cores are paired with other low power cores and unreset in groups while high power cores are reset individually, thereby creating or maintaining a linear pattern with minimal spikes or variances during the power-on of the processor (the unreset process).

Figure 6:
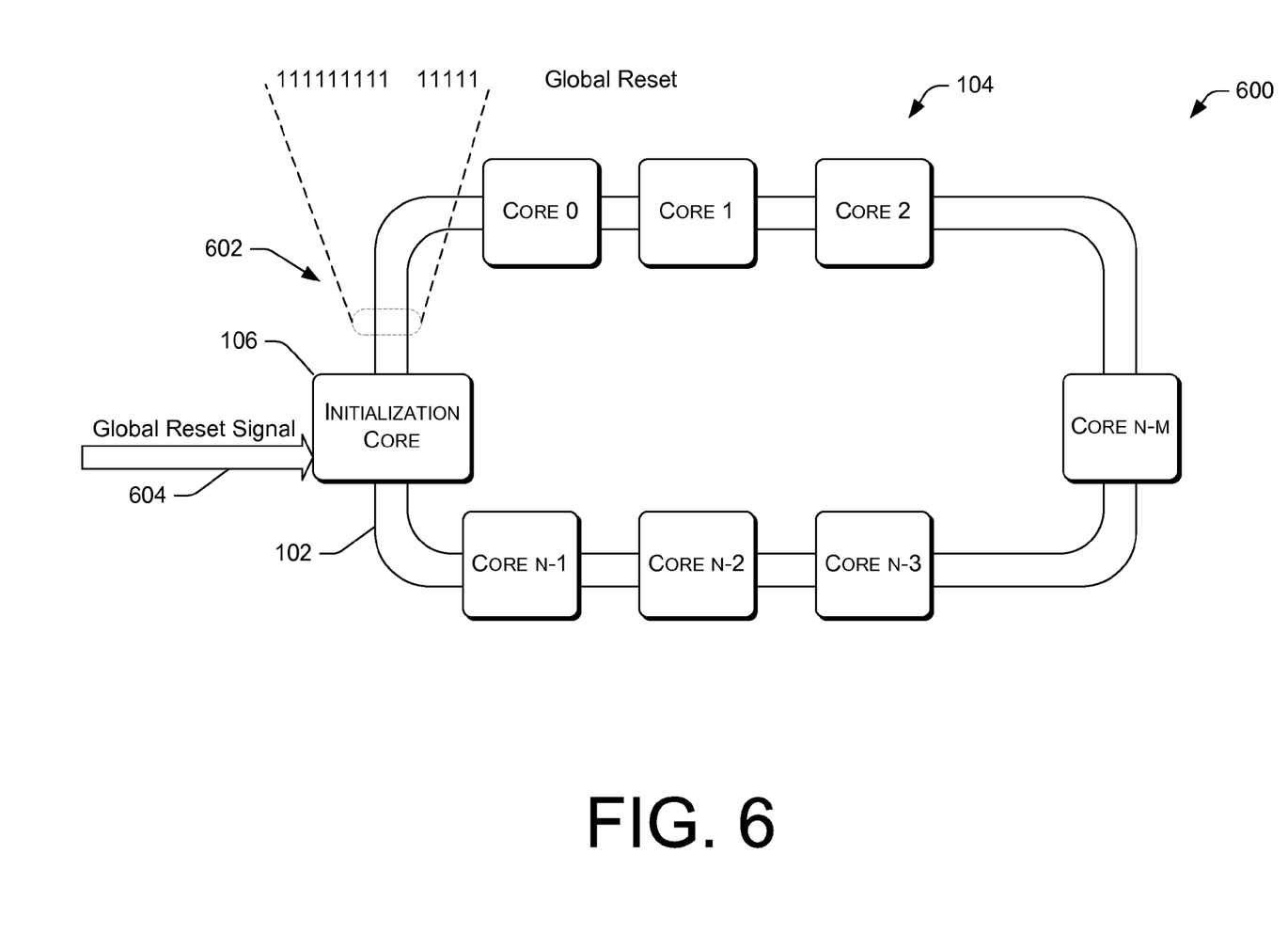
FIG. 6 is a schematic diagram of a multi-core processing unit where an initialization core issues a global reset in response to receipt of a global reset signal.

FIG. 6 is a schematic diagram of a multi-core processing unit 600 where an initialization core issues a global reset 602 in response to receipt of a global reset signal 604. The initialization core 106 may transmit the reset packets out to the various cores at a same time or substantially same time to reset the cores and power-off the cores. In some embodiments, the packet generation logic 114 may send the global reset using one packet for each core while the packet generation logic may also use fewer packets than cores to accomplish the global reset.

Figure 7:
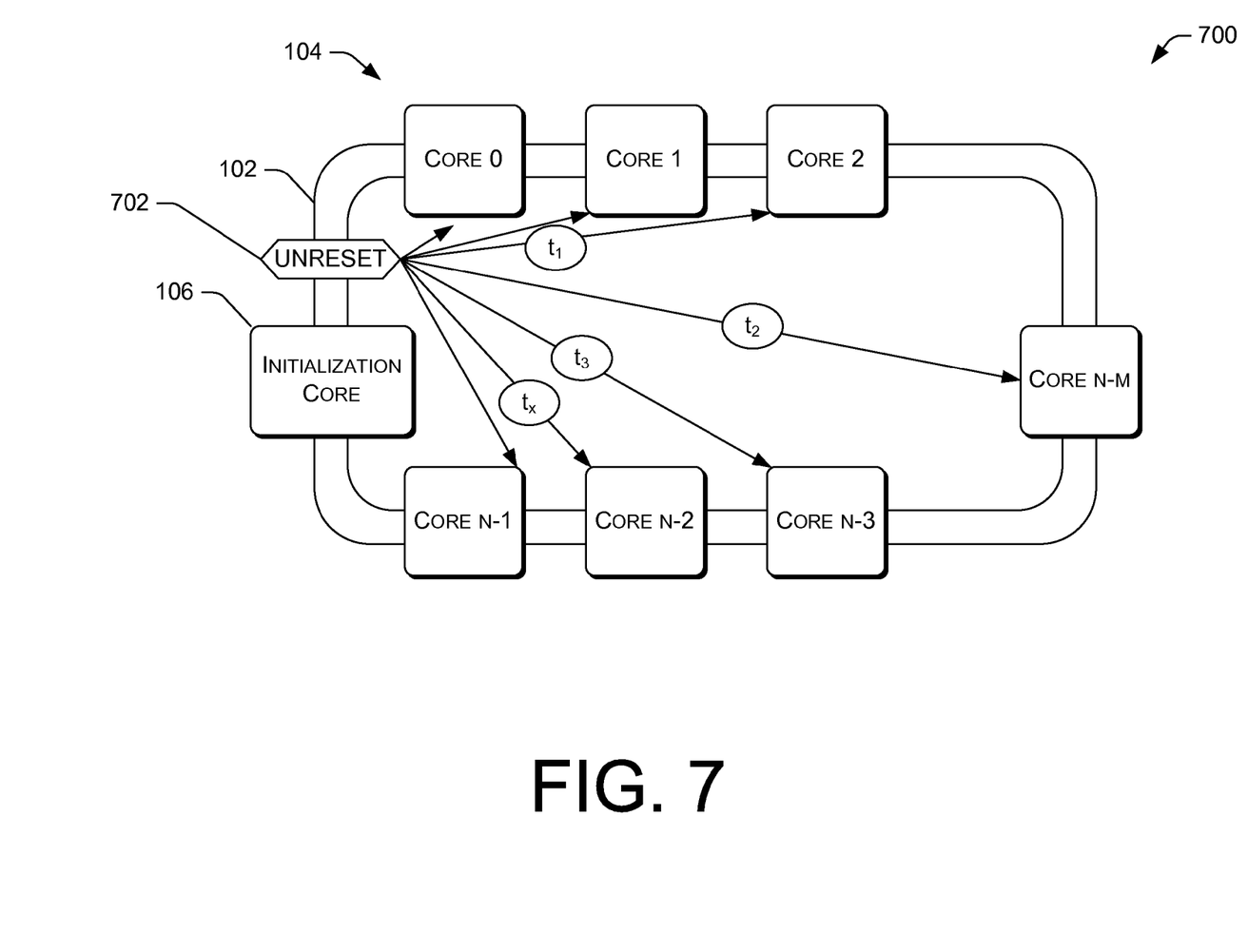
FIG. 7 is a schematic diagram of a multi-core processing unit where the initialization core issues an unreset message to stagger activation of the reset cores to gradually ramp up power consumption of the processing unit.

FIG. 7 is a schematic diagram of a multi-core processing unit 700 where the initialization core issues multiple unreset messages to stagger activation of the reset cores to gradually ramp up power consumption of the processing unit. An unreset packet 702 may be sent to each core at various times. For example, core 2 may receive the unreset packet at $t_1$, core n-m may receive the unreset packet at $t_2$, core n-3 may receive the unreset packet at $t_3$, and core n-2 may receive the unreset packet at $t_x$, where $t_1$, $\neq t_2$, $\neq t_3$, $\neq t_x$. Thus, by receiving the packets at different times, the unreset operations may be staggered to more slowly ramp up a power-on of the cores of the multi-core processor.

Illustrative Operation

Figure 8:
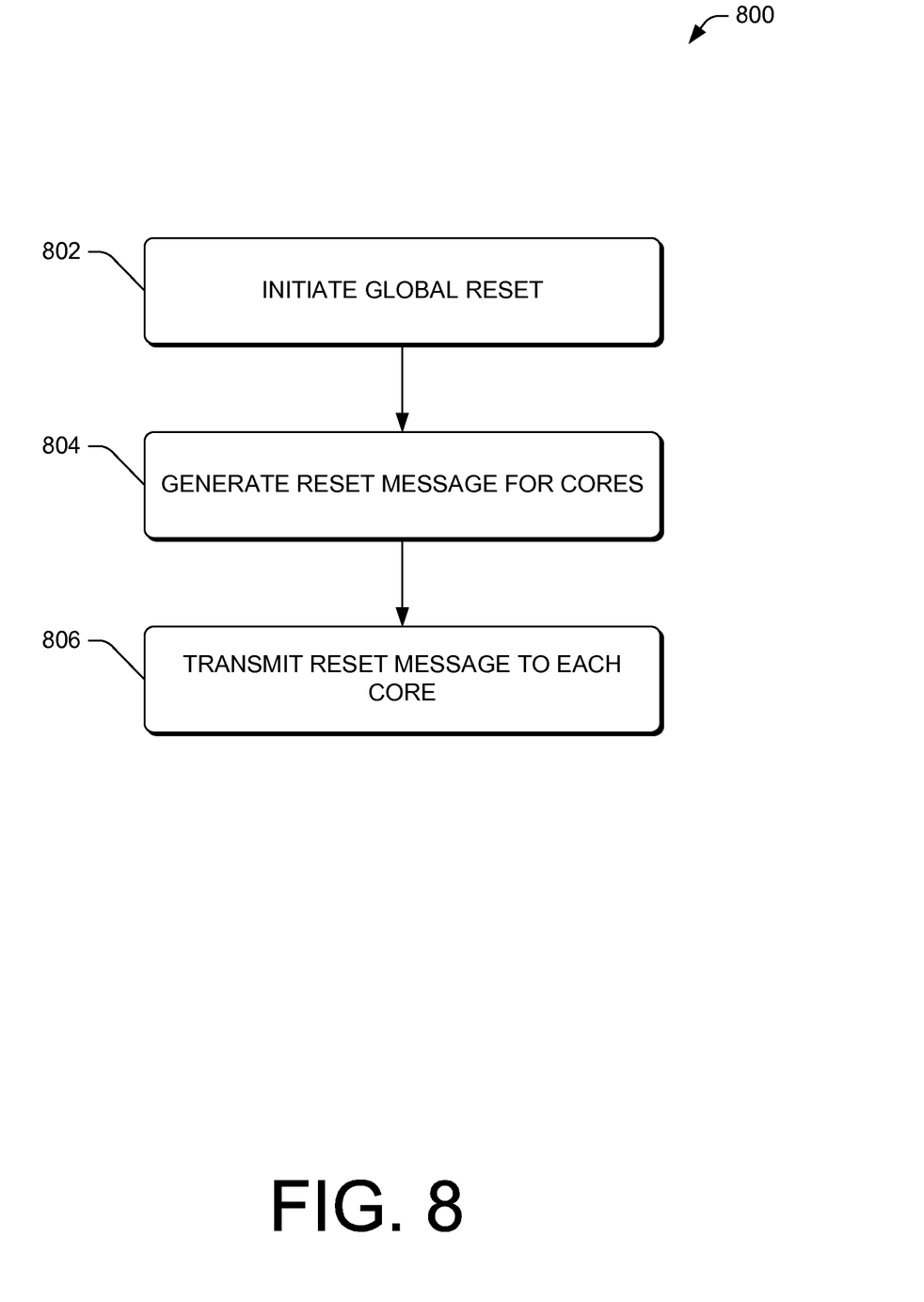
FIG. 8 is a flow diagram of an illustrative process to perform a global reset of cores of a multi-core processing unit.
Figure 9:
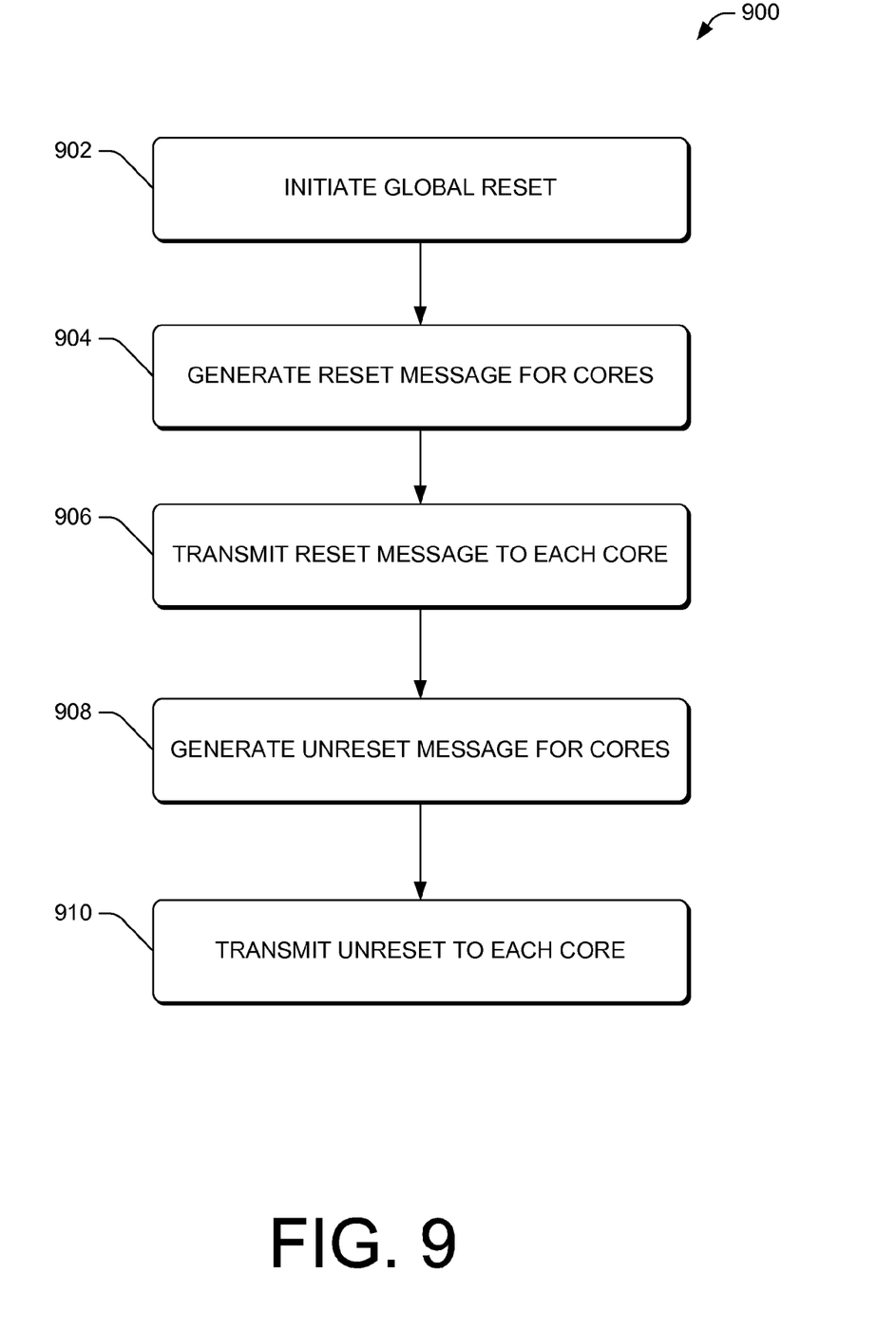
FIG. 9 is a flow diagram of another illustrative process to perform a global reset of cores of a multi-core processing unit.
Figure 10:
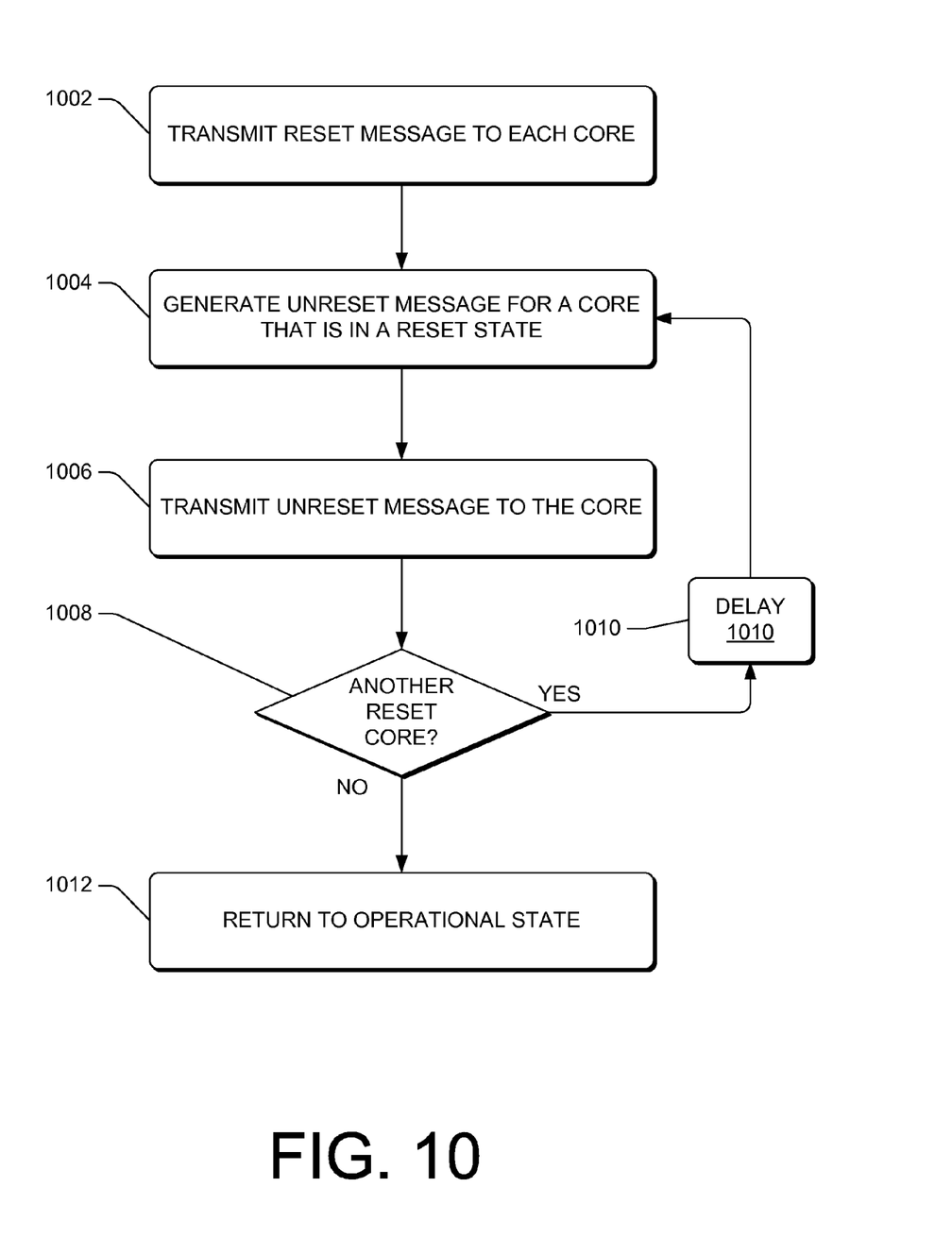
FIG. 10 is a flow diagram of an illustrative process to stagger activation of reset cores to gradually ramp up power consumption of the processing unit.

FIGS. 8-10 show illustrative processes to perform a global reset of cores of a multi-core processor. The processes are illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the processes. The processes are described with reference to the previously described environments. Of course, the processes may be performed in other similar and/or different environments.

FIG. 8 is a flow diagram of an illustrative process 800 to perform a global reset of cores of a multi-core processing unit. The process 800 may perform a staggered global reset of the cores by issuing a reset command. The cores may automatically return to power following the reset without an additional command, such as an unreset command.

At 802, the initialization core 106 may receive a global reset signal. The global reset signal may be activated in response to a user command, the system logic, or a combination of both. The global reset command may be received by the system logic 108 and/or the reset logic 112.

At 804, the initialization core 106 may generate a reset message for the cores. For example, the reset logic 112 may determine that the cores are to be reset based on the global reset signal. The reset logic 112 may then request packet transmission from the packet generation logic 114 to transmit the reset commands to the various cores. The reset logic 112 may also create or implement a staggered approach (using delays) to ensure that the cores do not all return to power (power-on) at a same time.

At 806, the packet generation logic 114 may transmit the reset message to each of the cores. In some instances, the reset messages may be staggered and thus arrive at the cores at different times. The cores may perform a reset upon receipt of the packet and command (or after a predetermined delay provided in the packet). The cores may then return to power after the reset. Thus, the packet generation logic 114 may not transmit a second packet to each core in some embodiments while still providing a staggered power on of the various cores. In some embodiments, the packets may include a delay command that causes the staggered power-on. Thus, the core may receive a packet, execute a delay, and then reset and unreset to power-on. The delay may be different for at least some cores to cause the staggered power-on of the processor.

FIG. 9 is a flow diagram of another illustrative process 900 to perform a global reset of cores of a multi-core processing unit. The process 900 may perform a global reset of the cores by issuing a reset command. The process 900 may then perform a staggered unreset of the cores.

At 902, the initialization core 106 may receive a global reset signal. The global reset signal may be activated in response to a user command, the system logic, or a combination of both.

At 904, the initialization core 106 may generate a reset message for the cores. For example, the reset logic 112 may determine that the cores are to be reset based on the global reset signal. The reset logic 112 may then request packet transmission from the packet generation logic 114 to transmit the reset commands to the various cores.

At 906, the packet generation logic 114 may transmit the reset message to each of the cores. The cores may perform a reset upon receipt of the packet and command (or after a predetermined delay). In accordance with various embodiments, a core, when reset, may remain in a powered-off state until the core receives an unreset message that initiates powering-on the core.

At 908, the initialization core 106 may generate an unreset message for each of the cores. For example, the reset logic 112 may determine that the cores are to be unreset in a staggered process to gradually return the processor to full power rather than powering on all cores at a same or substantially same time. The reset logic 112 may be tunable and thus may stagger the powering-on of the cores to create a consistent increase (e.g., linear increase) in power consumption of the processor. For example, the reset logic 112 may power on larger cores (cores that consume more power) one-at-a-time, while powering on smaller cores (that consume less power) in groups or individually. The reset logic 112 may then request packet transmission from the packet generation logic 114 to transmit the unreset commands to the various cores.

At 910, the packet generation logic 114 may transmit the unreset message to each of the cores. The cores may perform the unreset (power-on) upon receipt of the packet and command (or after a predetermined delay). For example, the packet may include a message that, upon receipt, causes the core to power-on. In another example, the message may include a predetermined delay for the core which, once expired, causes the core to power-on.

FIG. 10 is a flow diagram of an illustrative process 1000 to stagger activation of reset cores to gradually ramp up power consumption of the processing unit.

At 1002, the system logic 106, via the packet generation logic 114, may transmit a reset message to each core as discussed in the operation 906.

At 1004, the system logic 106, via the reset logic 112, may generate an unreset message for a core that is in a reset state.

At 1006, the system logic 106, via the packet generation logic 114, may transmit the unreset message to the core. The core may then return to a powered-on state after receipt of the unreset message via a packet.

At 1008, the system logic 106, via the reset logic 112, may detect whether other cores remain in a reset state, and thus are powered off. When the reset logic 112 determines that at least one other core is reset and powered-off (following the "yes" route from the decision operation 1008), then the process 1000 may then perform a delay at 1010 and then return to the operation 1004 to generate the unreset message for the core that is still reset.

In accordance with various embodiments, the delay 1010 may stagger the powering-on of the cores to enable a gradual ramp up of the power of the processor. In various embodiments, groups of cores may be unreset at a same time or substantially same time while still staggering the powering-on of the cores.

When no remaining cores are reset (all cores are powered-on in an unreset state), then the process 1000 may return to an operational state at 1012 following the "no" route from the decision operation 1008.

Illustrative System

Figure 11:
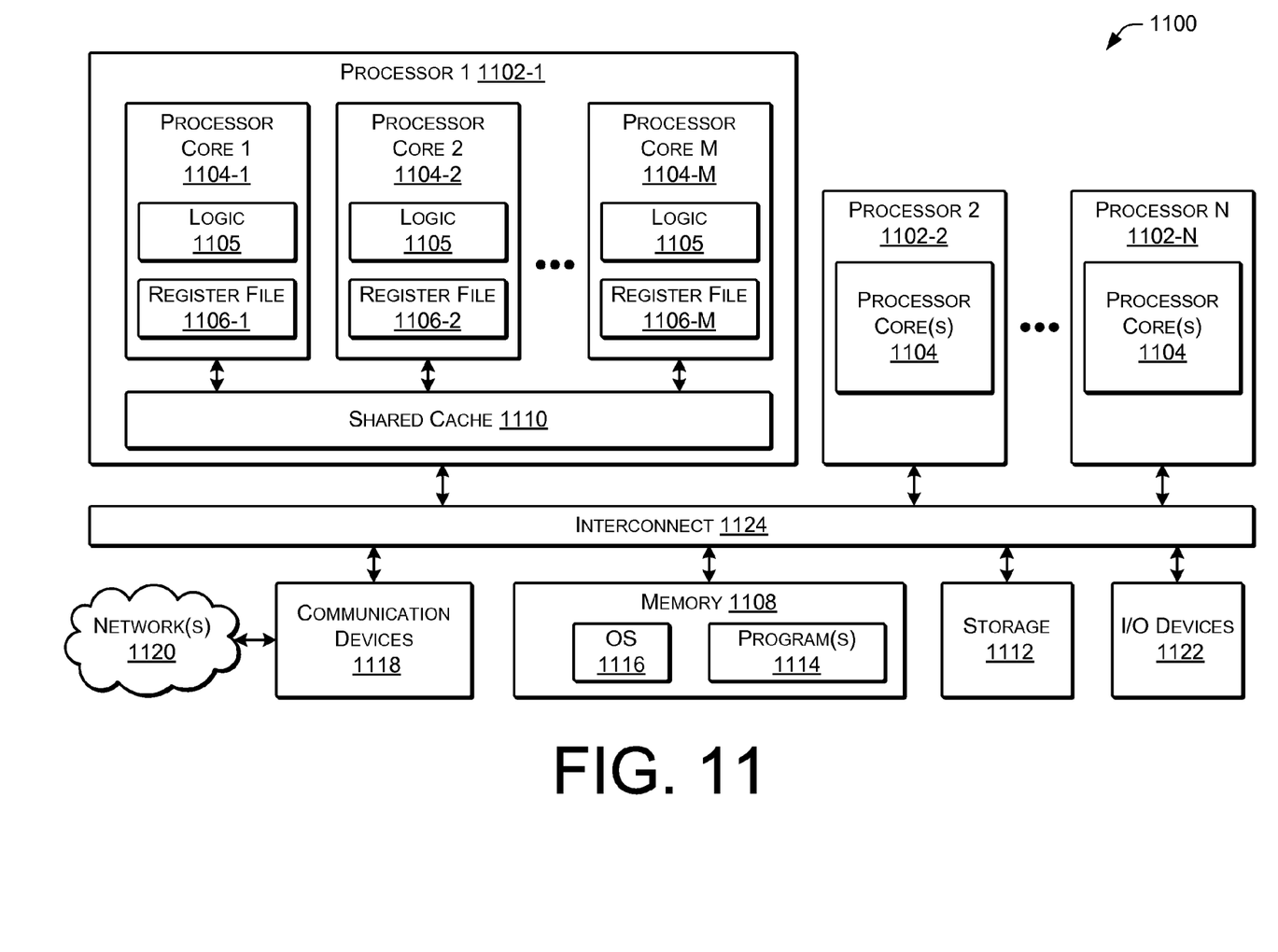
FIG. 11 is a block diagram of an illustrative system to perform a global reset of cores of a multi-core processing unit.

FIG. 11 illustrates nonlimiting select components of an illustrative system 900 according to some implementations herein that may include one or more instances of the processor architecture discussed above for implementing a global reset of cores in a multi-core processor. The system 1100 may include one or more processors 1102-1, 1102-2, ..., 1102-N (where N is a positive integer≥1), each of which may include one or more processor cores 1104-1, 1104-2, ..., 1104-M (where M is a positive integer≥1). In some implementations, as discussed above, the processor(s) 1102 may be a single core processor, while in other implementations, the processor(s) 1102 may have a large number of processor cores, each of which may include some or all of the components illustrated in FIG. 11. For example, each processor core 1104-1, 1104-2, ..., 1104-M may include an instance of logic 1105 to perform various tasks for that respective processor core 1104-1, 1104-2, ..., 1104-M. The logic 1105 may include one or more of dedicated circuits, logic units, microcode, or the like.

The processor(s) 1102 and processor core(s) 1104 can be operated to fetch and execute computer-readable instructions stored in a memory 1108 or other computer-readable media.

The memory 1108 may include volatile and nonvolatile memory and/or removable and non-removable media implemented in any type of technology for storage of information, such as computer-readable instructions, data structures, program modules or other data. Such memory may include, but is not limited to, RAM, ROM, EEPROM, flash memory or other memory technology. In the case in which there are multiple processor cores 1104, in some implementations, the multiple processor cores 1104 may share a shared cache 1110. Additionally, storage 1112 may be provided for storing data, code, programs, logs, and the like. The storage 1112 may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 1100, the memory 1108 and/or the storage 1112 may be a type of computer readable storage media and may be a non-transitory media.

The memory 1108 may store functional components that are executable by the processor(s) 1102. In some implementations, these functional components comprise instructions or programs 1114 that are executable by the processor(s) 1102. The example functional components illustrated in FIG. 11 further include an operating system (OS) 1116 to mange operation of the system 1100.

The system 1100 may include one or more communication devices 1118 that may include one or more interfaces and hardware components for enabling communication with various other devices over a communication link, such as one or more networks 1120. For example, communication devices 1118 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating via such networks are well known and will not be discussed herein in detail.

The system 1100 may further be equipped with various input/output (I/O) devices 1122. Such I/O devices 1122 may include a display, various user interface controls (e.g., buttons, joystick, keyboard, touch screen, etc.), audio speakers, connection ports and so forth. An interconnect 1124, which may include a system bus, point-to-point interfaces, a chipset, or other suitable connections and components, may be provided to enable communication between the processors 1102, the memory 1108, the storage 1112, the communication devices 1118, and the I/O devices 1122.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A processor comprising:
a plurality of processing cores;
an interconnect coupled to the plurality of processing cores; and
a first logic to transmit a reset signal to the plurality of processing cores on the interconnect, wherein the reset signal includes a reset operation to power-off the plurality of processing cores and an unreset operation to power-on the plurality of processing cores, wherein at least one of the reset operation or the unreset operation is staggered to extend a power-on of the processor;

wherein the reset information and the unreset information are transmitted using different packets.

2. The processor as recited in claim 1, wherein the reset signal causes a staggered power-on of the plurality of processing cores.

3. The processor as recited in claim 1, wherein the interconnect is arranged as a ring structure.

4. The processor as recited in claim 1, wherein the reset signal is transmitted to the plurality of processing cores by a packet that is transmitted using the interconnect.

5. A processor comprising:
a plurality of processing cores;
an interconnect coupled to the plurality of processing cores; and
a system logic to transmit reset information to the plurality of processing cores on the interconnect, wherein the reset information is to be formatted into a packet, wherein the reset information powers-off the plurality of processing cores, and wherein the system logic further transmits unreset information to the plurality of processing cores, the unreset information to power-on the cores;
wherein transmitting the unreset information is a staggered process that includes a delay between the unreset of at least some of the plurality of processing cores; and
wherein the reset information and the unreset information are transmitted using different packets.

6. The processor as recited in claim 5, wherein the reset information is staggered to delay the power-off of at least some of the plurality of processing cores.

7. The processor as recited in claim 5, wherein the unreset information is staggered to delay the power-on of at least some of the plurality of processing cores.

8. The processor as recited in claim 5, wherein the packet includes a delay to implement the reset information by a destination core that is a recipient of the packet.

9. The processor as recited in claim 5, wherein the system logic includes reset logic to stagger the reset information to the plurality of the processing cores, and wherein the system logic includes a packet generation logic to generate the packets having the reset information.

10. A method comprising:
generating a reset signal to reset a plurality of processing cores;
transmitting the reset signal on an interconnect coupled to the plurality of processing cores, wherein the reset signal to cause a power off of the plurality of processing cores; and
transmitting an unreset signal on the interconnect to power-on the plurality of processing cores in a staggered process that includes a delay between the unreset of at least some of the plurality of processing cores;
wherein the reset signal and unreset signal are transmitted using different packets.

11. The method as recited in claim 10, wherein the transmitting the unreset signal is staggered to cause at least some of the plurality of processing cores to power on at different times.

12. The method as recited in claim 11, wherein the staggering is to enable a gradual ramp up of a power consumption of the plurality of processing cores.

13. The method as recited in claim 10, wherein the reset signal is transmitted to the plurality of processor cores by a packet that is transmitted using the interconnect, and wherein the packet includes a delay to implement the reset signal by a destination core that is a recipient of the packet.

14. The method as recited in claim 10, wherein the interconnect is arranged as a ring structure.

15. A method comprising:
formatting a first packet to include reset information;
transmitting the first packet over an interconnect to a plurality of processing cores, wherein the reset information powers-off the plurality of processing cores;
formatting a second packet to include unreset information; and
transmitting the second packet with unreset information over the interconnect to power-on the plurality of processing cores in a staggered process that includes a delay between the unreset of at least some of the plurality of processing cores wherein the reset information and the unreset information are transmitted using different packets.

16. The method as recited in claim 15, wherein the transmitting the first packet is staggered to cause at least some of the plurality of processing cores to reset at different times.

17. The method as recited in claim 16, wherein the first packet includes a second delay to implement the reset information by a destination core that is a recipient of the packet.

18. The method as recited in claim 15, wherein the delay is to extend power-on and enable a gradual ramp up of a power consumption of the plurality of processing cores.

19. The method as recited in claim 15, wherein the reset information is to put the plurality of processing cores into a standby state.

* * * * *